Nov. 6, 1923.

M. H. PADE 1,473,509

GRAVITY CONVEYER

Filed May 18, 1920

INVENTOR
Max H. Pade
BY
ATTORNEY

Patented Nov. 6, 1923.

1,473,509

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

GRAVITY CONVEYER.

Application filed May 18, 1920. Serial No. 382,230.

*To all whom it may concern:*

Be it known that I, MAX H. PADE, a citizen of the United States, residing at Akron, in the county of Summit and State of Ohio, have invented certain new and useful Improvements in Gravity Conveyers, of which the following is a specification.

This invention relates to a conveyer, preferably a gravity conveyer, and is particularly directed to an improvement in means for allowing articles to be placed on the conveyer while maintaining those articles already on the conveyer in proper position. It relates to a gate to be used in connection with a chute, or trackway. It is especially designed for use in a rubber factory on a trackway for conveying tires or cores from one machine or operation to another. A further understanding of these tracks or chutes may be had from an inspection of my copending application, Serial No. 366,595, filed March 17, 1920.

This invention provides a break in the side of the chute, which is conveniently located at a close proximity to the operator, and through which opening the cores or tires may be inserted without lifting them from the floor, and is especially useful in conveyers receiving cores for two or more machines or operators. The cores are heavy and hot and they cause considerable discomfort to the operator if he has to pick them up. These gates or breaks in the track also do away with spur tracks or leads that take up considerable floor space.

Another object is to devise a latch that will allow the insertion of a core or tire in the chute and one that will normally extend over the upper edge of the cores in the chute and keep them from leaving the chute as they are run past other breaks in the track.

The above and other objects will more fully appear from the following description and will be especially pointed out in the claims.

Figure 1:
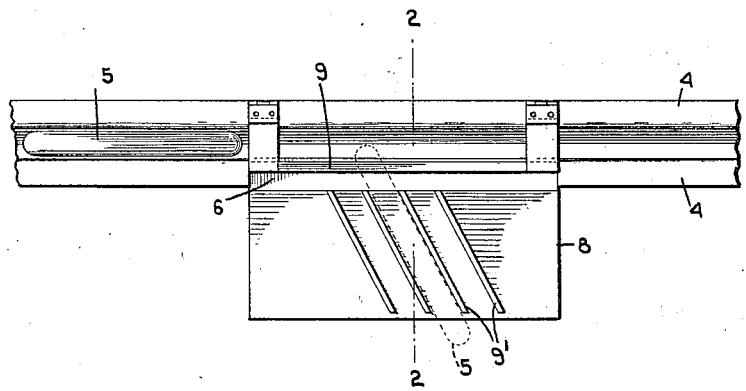
Fig. 1 is a fragmentary plan view of a trackway at the position of a break or gate.

The chute consists of a channel or V-shape track 1, which may be inclined to allow the cores or tires to roll by gravity and which is carried on supports 2 from the standards 3. Running parallel with the track 1, is a pair of guide rails 4 which are secured to the upper part of the standards 3. The rails 4 are rounded at their inner edge to assist in the free passage of the tire or core 5.

At the position where it is desired to insert a core, or other article, in the chute, one of the rails 4 is provided with a break 6 through which the core is moved to the track 1. Adjacent the track 1 and on a level with the top of it is a platform 7 which is connected to the floor level by an inclined board 8 upon which the tires or cores are rolled to the platform 7 and thence to the track. The board 8 is provided with a series of guide strips 9' adapted to lead the core to the track at the proper angle, (shown in dotted lines Fig. 1).

Figure 2:
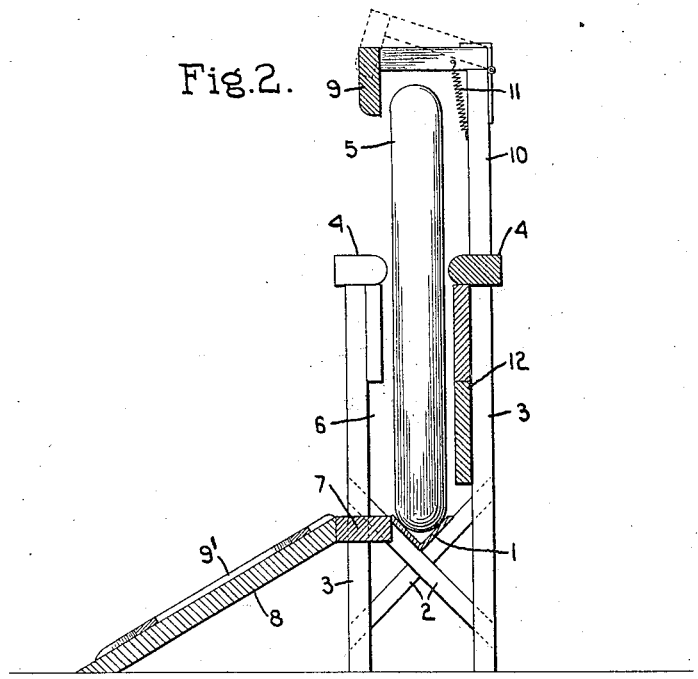
Fig. 2 is a sectional view on line 2—2, Fig. 1.

Over the entire break 6 in the rail of the chute is located a yieldable gate, the outer end of which depends downwardly, as shown in Fig. 2, and prevents the cores which are passing down the railway from falling out, said gate being carried or hinged on supports 10 arising from the standards 3. A spring 11 tends to normally keep the gate or latch 9 in a lowered position. The gate 9 may be considered as a supplementary rail and is rounded or beveled at its lower outer edge which allows the core to ride under and raise it, thus facilitating the insertion of the core to the chute. The gate, or latch, then springs over the core and prevents it from leaving the track. A stop plate 12 may be supported on the standards 3 opposite the platform 7 to receive the shock of the mold when it is rolled into the chute.

The form of chute or gravity conveyer herein illustrated is especially adapted for conducting cores or tires by gravity while in upright position as the gate or latch 9 prevents the tire or core from falling out of the conveyer as it passes the opening in the side rails. For this reason it is particularly useful where a single chute or runway is fed at one or more points. Were some such arrangement not provided, the cores on passing the lower gates on the runway would be in danger of falling out through the gaps which are made in the side rails. This arrangement is especially valuable where heavy cores are handled by gravity, as they are thus permitted to roll in vertical planes past a number of conveyer filling stations. The vertical positioning of the cores is of advantage over horizontal positioning of the cores, as a conveyer for this purpose occupies much less floor space and delivers the cores in position in which they can be easily operated upon.

These and other advantages will be apparent to one familiar with the art of manufacturing tires, and it will, also, be obvious to those familiar with other arts than the gravity conveyer herein shown that it is suitable for other purposes and uses.

It is to be understood that the construction described herein is illustrative of the preferred embodiment of the invention but that it is in no way restrictive and that the many possible changes and modifications within the scope of the appended claims are intended to be covered thereby.

I claim:—

1. In a device of the class described, the combination of a track, guide rails parallel to said track, one of said rails having a break to allow for the insertion of an article, and a latch supported at one side of the track adapted to keep the article on said track.

2. In a device of the character described, the combination of a track, guide rails above and parallel to said track, one of said rails having a break to allow for the insertion of a tire core, and a latch associated with the break adapted to keep the core on said track, said latch extending over the entire break in the guide rail.

3. In a device of the character described, the combination of a track, guide rails above and parallel to said track, one of said rails having a break to allow for the insertion of a tire core, and a latch extending over the entire break in the guide rail, said latch being normally held down and operable to admit the core to the track by passing said core through the break.

4. A chute comprising a track, guide rails parallel to said track, one of said guide rails having a break, a platform leading to said track, and a gravity latch supported opposite the said break, said latch being adapted to hold a core on said track.

5. A gravity conveyer for cores comprising an inclined track, parallel guides above the track whereby a core may be kept in vertical position, one of the said guides having a break, and a yieldably supported gate above the break permitting the insertion of a core, and maintaining cores within the conveyer in vertical position.

6. A conveyer comprising a track, parallel rails above said track constituting guides to maintain the articles therein in vertical position, one of said rails being provided with a break to permit insertion of articles in the conveyer, a supplementary rail above the break, and means for yieldingly supporting said supplementary rail.

7. A conveyer for annular articles comprising, an inclined track for supporting the articles in a position to roll thereon, parallel rails for maintaining the articles in position upon the track one of the rails having a break therein through which the articles may be inserted and positioned upon said track, and a movable latch member adapted to normally bridge the break said member being operable to admit cores to the track by passing said cores through said break.

MAX H. PADE.